United States Patent [19]  
Schulz et al.

[11] Patent Number: 4,981,719  
[45] Date of Patent: Jan. 1, 1991

[54] PROCESS FOR THE PRODUCTION OF A MAGNETIC RECORDING MATERIAL

[75] Inventors: Horst Schulz, Miesbach; Hans-Heinrich Credner, Hohenschaeftlarn; Johannes Gerum, Unterpfaffenhofen; Werner Wimbersky, Munich, all of Fed. Rep. of Germany

[73] Assignee: Agfa-Gevaert Aktiengesellschaft, Leverkusen, Fed. Rep. of Germany

[21] Appl. No.: 380,114

[22] Filed: Jul. 14, 1989

[30] Foreign Application Priority Data

Jul. 28, 1988 [DE] Fed. Rep. of Germany ....... 3825619

[51] Int. Cl.$^5$ .................. B05D 5/12; B32B 7/00; B32B 31/00
[52] U.S. Cl. ..................................... 427/128; 264/24; 264/40.2; 264/108; 264/134; 264/171; 264/211; 427/48
[58] Field of Search ................ 264/24, 40.1, 108, 129, 264/134, 171, 211, 40.2; 73/55; 252/62.54; 427/148, 128; 428/694, 900

[56] References Cited

U.S. PATENT DOCUMENTS

| | | |
|---|---|---|
| 3,622,386 | 11/1971 | Larsen ................................ 427/128 |
| 3,649,541 | 3/1972 | Ingersoll ........................ 428/900 X |
| 3,653,962 | 4/1972 | Akashi et al. ...................... 428/900 |
| 3,824,128 | 7/1974 | Akashi et al. ...................... 428/900 |
| 4,368,237 | 1/1983 | Yamada et al. ..................... 428/900 |
| 4,407,901 | 10/1983 | Miyatsuka et al. ................. 428/694 |
| 4,444,850 | 4/1984 | Matsufuji et al. .................. 428/694 |
| 4,465,608 | 8/1984 | Gerum et al. ..................... 252/62.54 |
| 4,465,737 | 8/1984 | Miyatuka et al. .................. 428/900 |
| 4,581,246 | 4/1986 | Melzer et al. ................... 427/128 X |
| 4,716,076 | 12/1987 | Morioka et al. ................ 428/694 X |
| 4,812,330 | 3/1989 | Ishikuro et al. .................... 427/128 |

FOREIGN PATENT DOCUMENTS

| | | |
|---|---|---|
| 137926 | 4/1985 | European Pat. Off. . |
| 1955699 | 1/1974 | Fed. Rep. of Germany . |
| 1929376 | 2/1974 | Fed. Rep. of Germany . |
| 2250384 | 4/1974 | Fed. Rep. of Germany . |
| 2538005 | 3/1976 | Fed. Rep. of Germany . |
| 1484958 | 9/1977 | Fed. Rep. of Germany . |
| 3139297 | 6/1982 | Fed. Rep. of Germany . |
| 3125567 | 1/1983 | Fed. Rep. of Germany . |
| 3302911 | 8/1983 | Fed. Rep. of Germany . |
| 3230874 | 2/1984 | Fed. Rep. of Germany . |
| 3322746 | 1/1985 | Fed. Rep. of Germany . |
| 3426366 | 1/1986 | Fed. Rep. of Germany . |
| 3629606 | 3/1988 | Fed. Rep. of Germany . |
| 3731804 | 3/1989 | Fed. Rep. of Germany . |
| 1415949 | 12/1975 | United Kingdom . |

OTHER PUBLICATIONS

Saunders, J. H. et al., "Polyurethanes Chemistry and Technology", in: *High Polymers* (New York, Interscience, 1962), pp. 17–29.

*Technologie der Magnet Bandherstellung* (Berlin, Akademie-Verlag, 1981), pp. 204–231.

Primary Examiner—Jeffery Thurlow  
Assistant Examiner—Leo B. Tentoni  
Attorney, Agent, or Firm—Connolly & Hutz

[57] ABSTRACT

An improved process for the production of a magnetic recording material including a non-magnetic layer support and, cast thereon, a magnetic dispersion including a mixture of at least two different batches of finely divided magnetic pigments finely dispersed in a polymeric binder is characterized in that the magnetic pigment batches are separately finely dispersed in a polymeric binder and/or a dispersion aid and/or a solvent until the necessary degree of dispersion is reached, after which they are combined, optionally provided with further additives and applied to the layer support, the degree of dispersion of the magnetic dispersions preferably being continuously determined by a colorimetric arrangement.

8 Claims, 4 Drawing Sheets

PROCESS FOR THE PRODUCTION OF A MAGNETIC RECORDING MATERIAL

BACKGROUND OF THE INVENTION

This invention relates to a process for the production of a magnetic recording material consisting of a non-magnetic layer support and, cast thereon, a magnetic dispersion consisting essentially of a mixture of at least two different types of finely divided magnetic pigments finely dispersed in a polymeric binder.

It is known that the properties of magnetic recording materials have to meet stringent requirements both in regard to mechanical stability and in regard to electroacoustic properties In addition to many other parameters, high surface homogeneity of the magnetic layer is an essential requirement for adequate performance. To obtain these properties, it is necessary inter alia to choose suitable polymeric binders, dispersants and magnetic pigments.

To produce the recording materials, the finely divided magnetic pigments are normally processed with the usual additives, such as dispersion aids and, optionally, non-magnetic fillers, and the binders dissolved in organic solvents in a dispersion unit, for example a ball mill of the pot or stirred type, to form a dispersion. The dispersions are generally prepared by processes employed for the production of lacquers. In there processes it is very important not only to observe the chemical composition very accurately but also to employ a complicated mechanical process in dispersion apparatus which will be described below. This and the physical-chemical properties of the components of the dispersion and their interaction determine the internal structure of the dispersion, of which the degree of dispersion and the degree of agglomeration of the individual particles, in particular of the magnetic pigments, play a decisive role. Electrostatic and magnetostatic forces between the pigments may lead to the formation of agglomerates which only come to light later in the manufactured magnetic recording carrier. The dispersion thus prepared is then applied to the layer support by means of standard coating machines.

The major characteristics which determine the quality of the dispersion are the degree of dispersion or degree of agglomeration, the particle density and the viscosity. Another important factor is the stability of the dispersion, which depends to a large extent on the time in that it may change during the time that elapses between the preparation of the lacquer and casting of the dispersion. The dispersion is normally prepared in three stages:

1. Preliminary grinding of the magnetic pigment is carried out with or without solvent in the presence of a wetting agent and optionally a dissolved polymeric binder.

2. In the predispersion stage, the pigment deposit described under 1 is dispersed into a concentrated binder solution, whereupon other of the additives mentioned above may be added.

3. The required degree of dispersion of the magnetic dispersion is finally obtained in a more prolonged process of fine dispersion.

At the present time, the quality of the dispersion is tested during production by preparing a sample of cast dispersion which is substantially similar to a finished magnetic recording carrier, and its quality is then tested. Subsequent treatment of the dispersion depends on this test. It will be obvious that such testing is time-consuming, expensive and inaccurate since it is not possible to have any information about the state of the dispersion immediately before and during application of the dispersion to a support.

EP 0146 015 describes a rapid method for determining the degree of dispersion in flowing two-phase systems. The pressure drop in the dispersion as it flows along a specified length of path is measured. This method would appear to be too inaccurate for the purpose stated above.

A process for measuring the electrokinetic Zeta potential of a dispersion is disclosed in DE-PS 23 37 165. A sample stream is continuously removed from the dispersion under investigation and transferred to a separating cell in which the stream of sample is exposed to a magnetic field and divided up into several partial streams. These partial streams are then passed through separate measuring cells in which the solids content of the individual partial stream is determined. This method of measuring determines the electrostatic charge of the pigment in relation to the polymeric binder system and characterises the stability of the dispersion but not the degree of dispersion.

A process for determining the degree of dispersion of magnetic dispersions is known from Journal Dispersion Science and Technology, 7 (2), pages 159 to 185 (1986). This method uses the uptake of mercury on the surface of the magnetic pigments to assess their volume. This method is too elaborate and unsuitable as a rapid test.

According to EP 0 103 655, the dispersion flowing through a tube is exposed to a magnetic alternating field of variable frequency and the results are used to determine the susceptibility. This method of determination depends to a great extent on the coercivity of the magnetic pigments and on the rate of throughflow and is therefore unsuitable as a universal measuring method for use in production processes. A similar apparatus is described in Japanese Application No. 58-76758.

An apparatus for measuring the aggregation of particles against a wall or with one another is described in DE-OS 29 29 018. The particles are in this case dispersed in a stream of liquid or gas. The liquid or gaseous multiphase system is directed towards a transparent wall and illuminated. The light which is scattered, reflected or attenuated by absorption is directed towards a detector and assessed. Measurement of the aggregation of particles with one another or against the wall is only possible with highly diluted dispersions which are transparent. It is not suitable for highly concentrated dispersions containing magnetic particles, since such dispersions are opaque. With certain magnetic recording materials, two or more layers containing different pigments are cast over on another to obtain the desired electroacoustic properties. Other magnetic recording materials comprise only one magnetizable layer, although mixtures of different magnetic pigments, for example chromium dioxide and iron oxide or ferrite and/or metal powders or metal powder alloys, are used in this magnetizable layer. Recording supports of this type are known, for example, from the publications DE 19 29 376 (U.S. Pat. No. 3,653,962), 19 55 699 (U.S. Pat. No. 3,824,128), 25 38 005 (GB 1 484 958) and 33 22 746 and from OS 47 16 076 U.S. Pat. No. 4,716,076. The processes normally used for fine dispersion of the magnetic pigments are known from numerous publications, for example from the book entitled "Technologie der Magnetbandherstellung (Technology of Magnetic Tape Manufacture)" (Akademie - Verlag Berlin, 1981) and from Applicants' pending U.S patent application Ser. No. 07/242,521, filed Sept. 12, 1988. However, the magnetic recording materials thus produced often do not have optimal and/or reproducible electroacoustic properties. The various polymeric binders and dispersion aids for improving the properties are all described in numerous patent applications.

Other publications put forward technological proposals to improve dispersion, including for example step-by-step addition of the binders, dispersants or solvents Recently, many magnetic recording materials have also been required to show a high packing density. This requirement can largely be satisfied by reducing the binder content, albeit at the expense of dispersion stability.

SUMMARY OF THE INVENTION

Accordingly, the object of the present invention is to provide a process for the production of magnetic recording materials of the type described above which does not have any of the above-mentioned disadvantages and which is simple and reproducible. According to the invention, this object is achieved by a process for the production of a magnetic recording material including a non-magnetic layer support and, cast thereon, a magnetic layer dispersion of a mixture of at least two different batches of finely divided magnetic pigments. First, the magnetic pigment batches are separately finely dispersed optionally in either a polymeric binder or a dispersion aid or a solvent or any combination of these three until a desired degree of dispersion is reached. The degree of dispersion of the magnetic pigments is preferably determined continuously by a colorimetric arrangement, wherein the dispersion is illuminated and the light diffusely reflected by the dispersion is assessed colorimetrically and compared with a colorimetric measurement obtained with a reference sample (standard). The separate magnetic pigment batches are then combined, optionally provided with further desirable additives, and applied to the layer support. Once the magnetic pigment batches are combined it also may be desired to further grind the combination of pigments before applying same to the layer support. Other particulars of the invention can be found in the specification and the drawings.

DESCRIPTION OF THE PREFERRED EMBODIMENT

Figure 4:
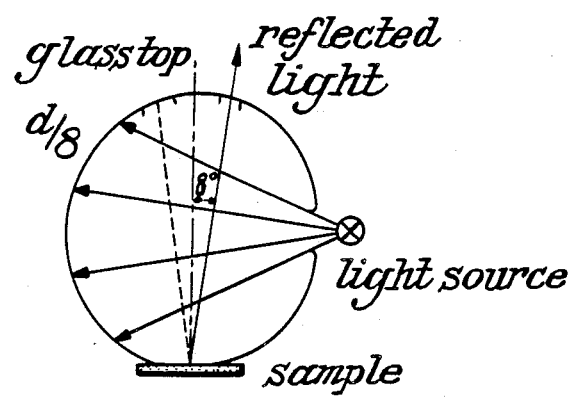
FIG. 4 shows one illumination and measurement geometry for determining the light reflected from a sample in accordance with prior known colorimetric measurement techniques.

The starting point for the present invention was the fact that the arrangement described in Applicants' pending U.S. patent application Ser. No. 07/242,521, filed Sept. 12, 1988 provides for simple and very accurate continuous determination of the degree of dispersion of magnetic dispersions. The dispersion is illuminated and the light diffusely reflected by the dispersion is assessed colorimetrically and compared with a standard. Colorimetric methods of determining a particular product quality are known, for example, from the technology of textile dyeing or the lacquering of articles in the case of solid substances. For the present purpose the most suitable of the conventional colorimetric measuring geometries set forth in CIE-Publication No. 15 is that of FIG. 4:

The sample is illuminated diffusely through a hollow sphere which has an internal, matt white lining, and the light reflected at an angle of 8° to the perpendicular is measured. In this arrangement, a black gloss trap may be provided to eliminate the light due to gloss.

Figure 5:
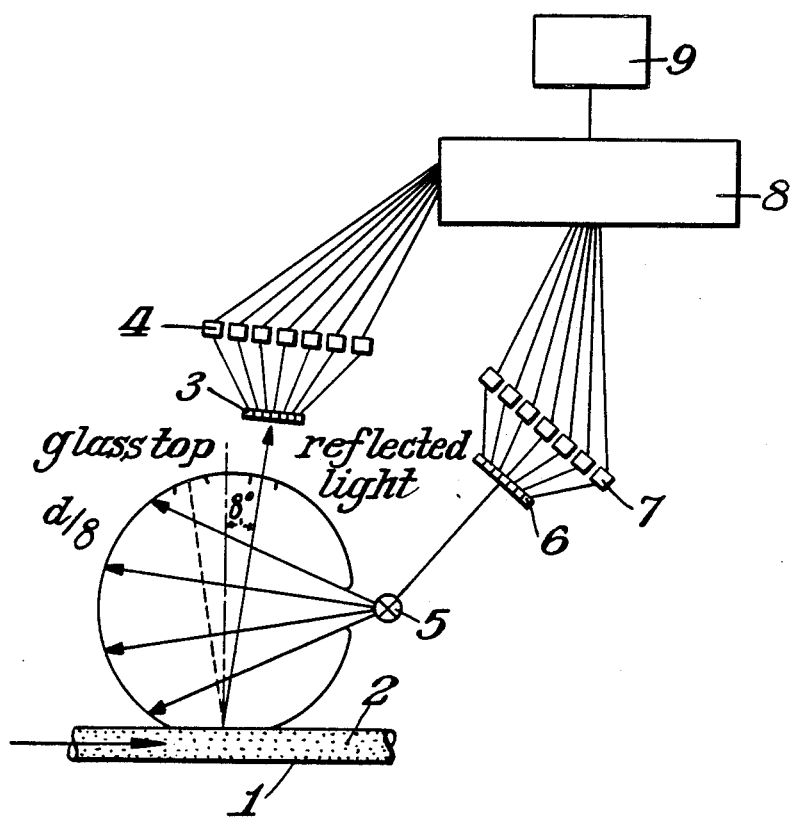
FIG. 5 shows a preferred arrangement for determining the degree of dispersion of a magnetic dispersion using a colorimetric technique.

A schematic illustration of the preferred arrangement for continuously determining the degree of dispersion is shown in FIG. 5. The magnetic dispersion (2) flowing through a tube (1) which has transparent, as far as possible delustred walls is illuminated diffusely as described above. The diffusely reflected light is broken down spectrally, for example by means of a holographic grid (3), and the separated components of light are measured with the corresponding number of photoelectric diodes (4), for example at wavelength intervals of 20 nm in the region of 400 to 700 nm. The light emitted from the light source (5) is analogously broken down spectrally (6) and measured in the same way as the diffusely reflected light (7). An arrangement of two Xenon flash lamps operating under pulsed conditions in a two-beam process are preferably employed. The method of colorimetric assessment is described below.

The principle of colorimetric measurement consists, as is well known to the man of the art in this field, in measuring the light emitted from a sample by a spectral measurement carried out at certain wavelengths, the so-called selection wavelengths, inserting the measured values in colour physiological functions and calculating from the result the colour shade, colour saturation and brightness for a particular type of standard light. The CIE-LAB colour system according to CIE-Publication No. 15 has become widely established as a method of presenting the calculated values. In this system, the colour values ($\Delta a^*$, $\Delta b^*$) and the brightness values ($\Delta L^*$) are represented as vectors extending from the achromatic point at the centre of the diagram to make up the end value, the colour distance $\Delta E^*$.

$$\Delta E^* = \sqrt{(\Delta L^*)^2 + (\Delta a^*)^2 + (\Delta b^*)^2}$$

In the present case, the light which is emitted from the light source (5) and from the sample of dispersion (2) and is decomposed spectrally (3, 6) and measured by the photoelectric diodes (4, 7) is processed in the calculating unit 8 (FIG. 5) and used to calculate the colour distance $\Delta E^*$, i.e., the colour and/or brightness distance between the light source (reference) and the light diffusely reflected from the sample, and the result is indicated, for example digitally, or displayed graphically on a screen (9). Apparatus of this type are available commercially and have measuring and calculating times of less than 1 second so that the required values are available extremely rapidly.

Figure 1:
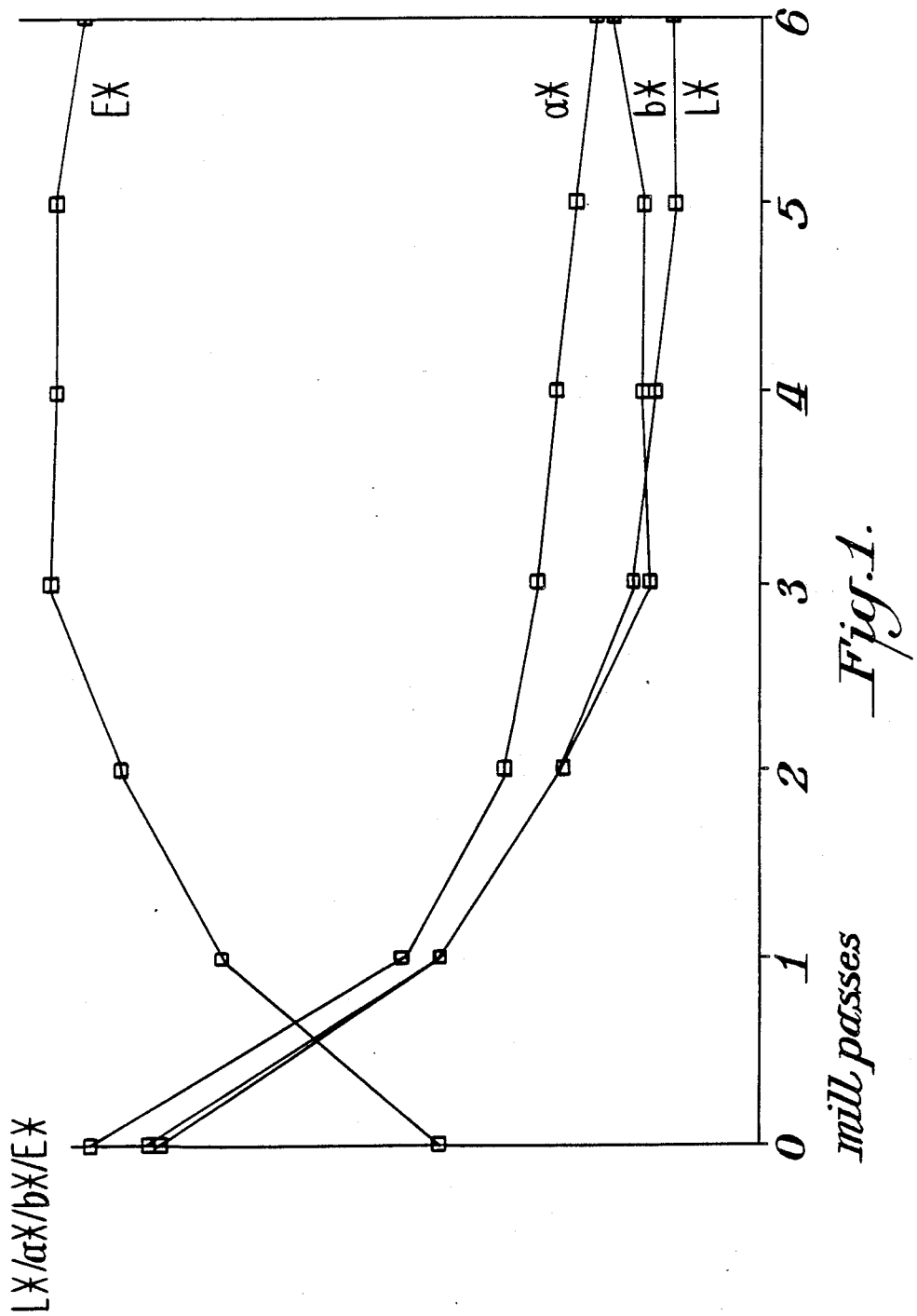
FIG. 1 shows a plot of brightness value L*, colour value a*, colour value b* and colour distance E*, for a magnetic dispersion containing a combination of different pigments versus the number of mill passes.
Figure 2:
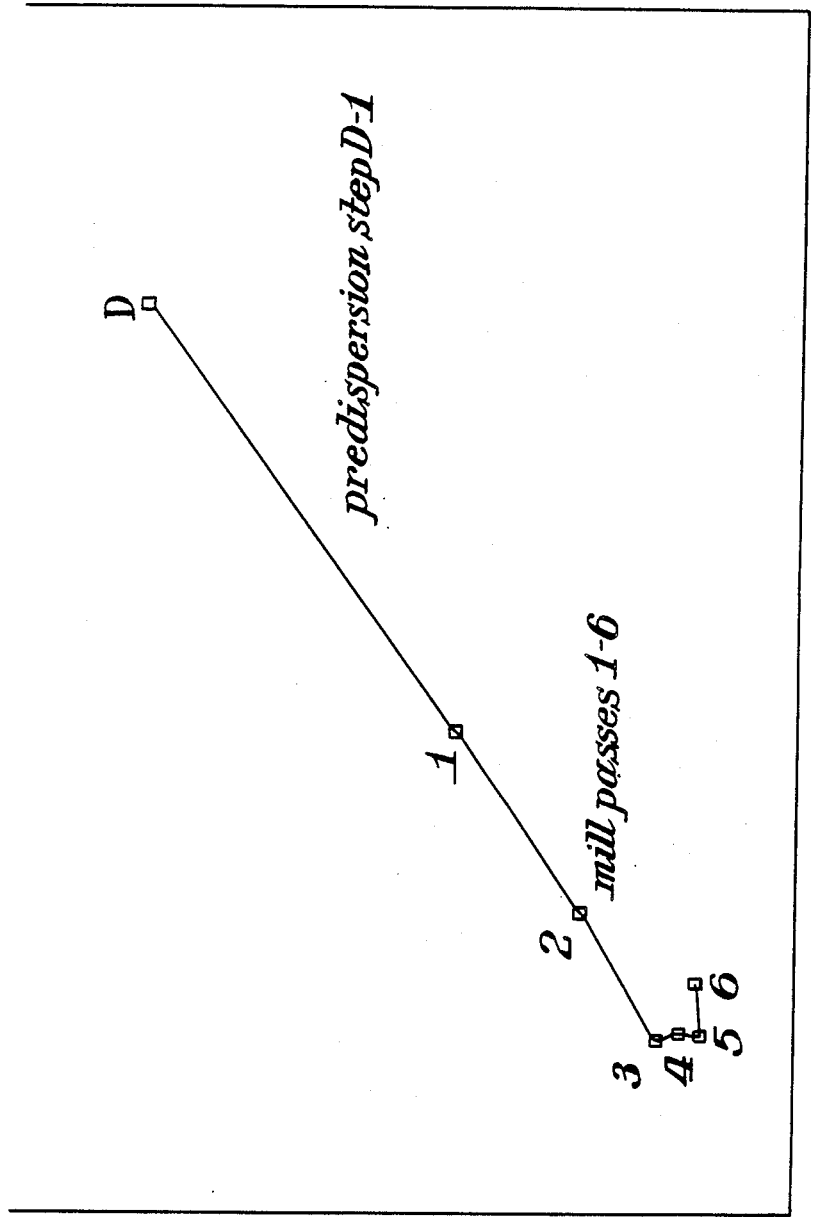
FIG 2 shows a plot of brightness value L* versus color value b* for a magnetic dispersion containing a combination of different pigments. The numerals 1-6 correspond to the number of mill passes.

It is found that the changes in colour and/or brightness during coarse dispersion and fine dispersion give an extremely sensitive indication of the degree of dispersion of the magnetic pigments, which is much more accurate than previous measuring methods mentioned above so that the aim of accurate quality control of the dispersion can be achieved. The desired end value is obtained when the colour distance is equal to that which has been laid down on the basis of a colorimetric measurement obtained with a reference sample (standard). It was found with use of a continuous determination of the degree of dispersion that, beyond a certain time, the grinding of a magnetic dispersion containing pigments of different type, namely 85% $CrO_2$ and 15% $\gamma$-$Fe_2O_3$, shows a discontinuous trend or rather a curve reversal of certain optical parameters (FIG. 1). This is even more clearly apparent from FIG. 2 in which $L^*$ is plotted against $b^*$. It may thus be concluded that the pigments are actually partially destroyed by overgrinding.

It is crucial to the process according to the invention that the different magnetic pigments on which the pigment mixture is based be *separately* ground with or without the additives mentioned above, the degree of grinding or dispersion of the separate dispersions be reliably determined, preferably by the process described in the above-cited application DE 37 31 804, after achieving the optimal degree of dispersion, the hitherto separate dispersions be combined and optionally provided with further additives before further processing as described above.

The key additives for producing a magnetic recording material by the process according to the invention are described in detail in the following.

(a) Dispersants

Dispersants which make the magnetic pigments easier to disperse are known in large numbers, for example Gafac, lecithin and also dodecylbenzenesulfonic acid, as known from DE-OS 22 50 384. Other dispersants are described in DE-OSS 31 25 567, 32 30 874 31 36 083 OS 31 36 086 (U.S. Pat. No. 4,407,901) and 33 02 911, 31 39 297, 34 26 366 and 36 29 606 and in EP 0 137 926.

(b) Polymeric binders

The binder suitable for use in the process according to the invention is a standard thermoplastic resin, thermosetting resin, a reactive resin or a mixture of such resins. Examples of thermoplastic resins are vinyl chloride/vinyl acetate copolymers, vinyl chloride/vinylidene chloride copolymers, vinylidene chloride/acrylonitrile copolymers, vinyl chloride/acrylonitrile copolymers, (meth)acrylate/acrylonitrile copolymers, (meth)acrylate/vinylidene chloride copolymers, (meth)acrylate/styrene copolymers, urethane elastomers, urethane resins, polyvinyl fluoride, butadiene/acrylonitrile copolymers, polyamine resins, polyvinyl acetyl resins, cellulose derivatives, for example cellulose acetobutyrate, cellulose diacetate, cellulose triacetate, cellulose propionate, cellulose acetopropionate and nitrocellulose, styrene/butadiene copolymers, polyester resins and other suitable thermoplastic resins.

The thermosetting resins or reactive resins are those of which the molecular weight increases to high values by condensation or addition, by heating or by irradiation with light. Examples are phenolic resins, epoxy resins, curable polyurethane resins, urea resins, melamine resins and acrylate resins, thermosetting polyurethane resins being preferred. The binders may be used individually or in combination. The mixing ratio of the ferromagnetic pigments to the binder is of the order of 8 to 25 parts by weight binder to 100 parts by weight magnetic pigments.

(c) Magnetic pigments

The ferromagnetic pigments comprise ferromagnetic iron oxides, such as $\gamma$-$Fe_2O_3$, $Fe_3O_4$ or $\gamma$-$Fe_2O_3$ or $Fe_3O_4$ with Co, Zn or other metals in solid solution, or ferromagnetic chromium dioxides, such as $CrO_2$ or $CrO_2$ with metallic elements, for example Li, Na, Sn, Pb, Fe, Co, Ni and Zn, or halogen atoms in solid solution. Ferromagnetic metal pigments with an oxide coating on their surface to improve their chemical stability may also be used in accordance with the invention.

(d) Crosslinking agents

To achieve the higher mechanical durability of the magnetic recording material required in accordance with the invention, a difunctional or polyfunctional isocyanate compound is added to the dispersion as crosslinking agent, as already mentioned, in a quantity which may be determined by any expert in routine tests. From 0.2 to 30% by weight isocyanate, based on the binder, may be used for the process according to the invention.

Polyfunctional isocyanates belong to the prior art, suitable compounds being described, for example, in DE-OS 20 33 782, which corresponds to U.S. Pat. No. 3,649,541. The production of diisocyanates is described, for example in "High Polymers", Volume XVI, Polyurethanes, page 21.

(e) Solvents

Organic solvents are normally used for the preparation of the dispersion. Examples of suitable solvents are ketones, such as methyl ethyl ketone and cyclohexanone, alcohols, esters, such as ethyl acetate and butyl acetate, cellosolves, ethers, aromatic solvents, such as toluene, and chlorinated hydrocarbons as solvents, such as carbon tetrachloride, tetrahydrofuran and chloroform, ketones and esters being preferred.

(f) Lubricants

Examples of suitable lubricants are silicone oils, such as polysiloxanes, inorganic particles, such as graphite and molybdenum disulfide, fine particles of plastics, for example of polyethylene and polytetrafluoroethylene, higher aliphatic acids, higher alcohols, higher aliphatic acid esters and fluorocarbons. Of these lubricants, the higher aliphatic acids and esters thereof are preferred. The lubricants are used in quantities of from 0.1 to 20 parts by weight per 100 parts by weight binder.

(g) Other additives

Suitable abrasives are, typically, fine inorganic particles, for example molten aluminium oxide, silicon carbide, chromium trioxide, corundum and diamond with an average particle size of from 0.05 to 0.5 $\mu$m. The abrasives are used in quantities of from 0.5 to 20 parts by weight per 100 parts by weight binder. Examples of suitable antistatic agents are electrically conductive particles, for example those of graphite, carbon black and carbon black graft polymers, nonionic surfactants, anionic surfactants and cationic surfactants.

(h) Layer supports

Examples of suitable non-magnetic layer supports are synthetic resins, for example polyesters, polyamides, polyolefins and cellulose derivatives, non-magnetic metals, glass, ceramics and paper. The layer support is used in the form of a film, a tape, a sheet, a card, a disc, a drum or any other suitable form.

The production of the magnetic dispersion by the process according to the invention is carried out as described in the following. As shown in the following Examples, each fraction of the magnetic pigments intended for the pigment mixture is separately dispersed by finely dispersing each fraction in a dispersion aid and/or a polymeric binder and/or a wetting agent, which may be done for example in a pot ball mill or in a stirred ball mill or in a cascade of several mills arranged in series. This process of separate dispersion has inter alia the major advantage that the optimal type and quantity of dispersant, binder and wetting agent can be selected for each pigment type, for example $Fe_2O_3$ or $CrO_2$. The different pigment fractions are then finely dispersed as described above until the necessary degree of dispersion is reached. In a preferred embodiment of the invention, as already described the degree of dispersion is preferably measured continuously. The colorimetric determination of the degree of dispersion described is particularly accurate and unequivocal.

Once the requisite degree of dispersion of the individual pigment batches has been reached, the batches are combined and optionally provided with further additives, as described above. A completely homogeneous magnetic dispersion is obtained by subsequent repeated filtration.

The magnetic dispersion is then applied to the non-magnetic layer support by means of suitable coating machines, for example by means of an extrusion coater. Before the liquid dispersion is dried on the support, which is best done for 2 to 5 minutes at temperatures of 50° to 90° C., the anisotropic magnetic pigments are oriented in the proposed recording direction by the action of a magnetic field. The magnetic layers may then be smoothed and sealed in typical machines by passage between heated and polished rollers, optionally under pressure and at temperatures in the range from 50° to 100° C. and preferably at temperatures in the range from 60° to 80° C. The thickness of the magnetic layer is generally between 1 and 20 μm.

The magnetic recording material produced in accordance with the invention are distinguished by minimal surface roughness. The principal advantages of the recording supports thus produced are the improved electroacoustic properties of the magnetic layer, in addition to which distinctly improved constancy of the individual batches of the magnetic recording supports is achieved in this way.

The following Examples are intended to illustrate the invention without limiting it in any way. In the Examples, all parts are parts by weight.

EXAMPLE 1

Batch 1

Figure 3:
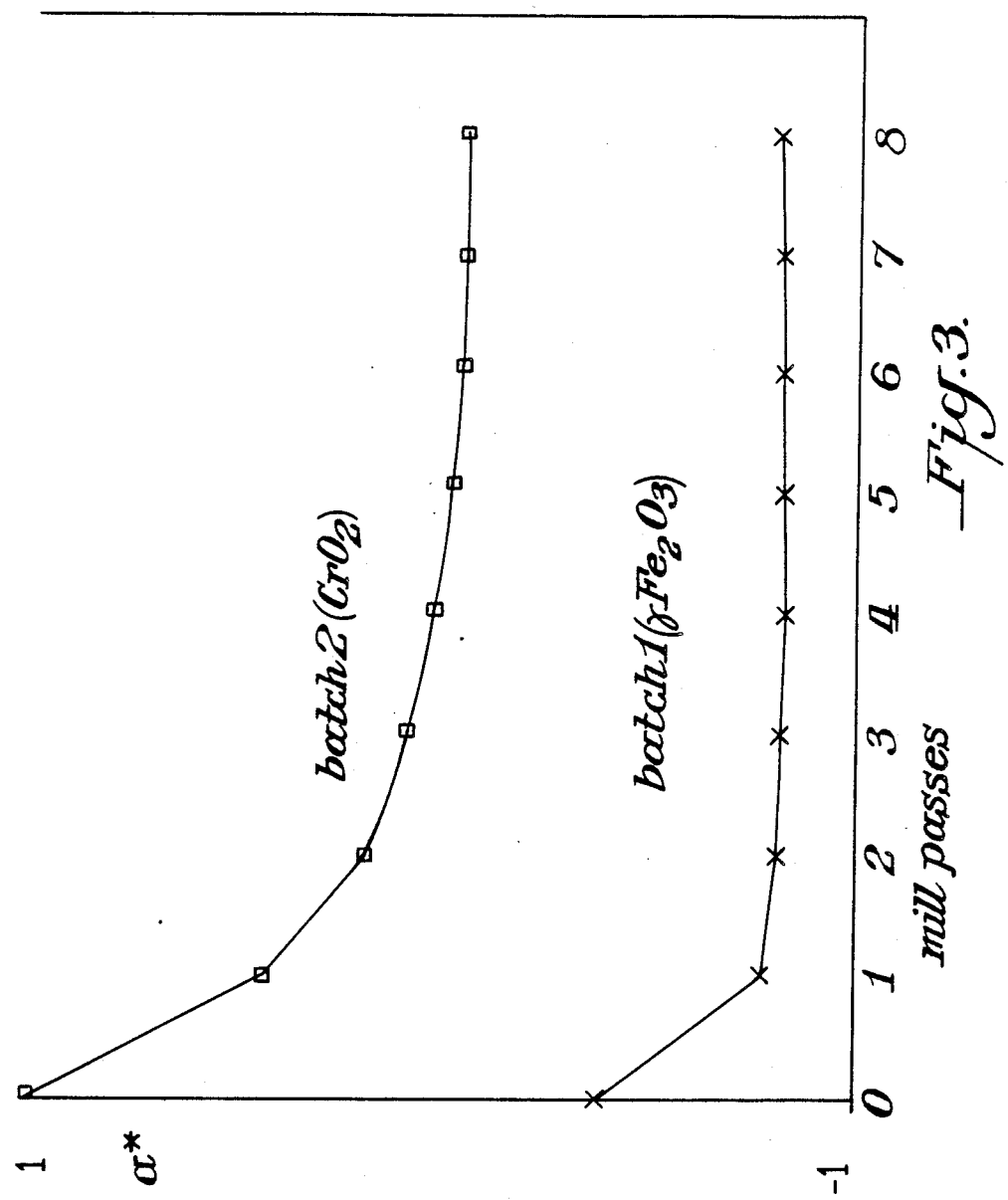
FIG. 3 shows a plot of color value a* versus the number of mill passes, comparing the degree of dispersion of batches from Example 1 for each pigment type.

1200 Parts acicular Co-doped $\gamma$-$Fe_2O_3$ having a coercitivity of 27 kA/m were predispersed with 105 parts vinyl chloride/vinyl acetate/vinyl alcohol copolymer, 128 parts polyester polyurethane, 30 parts acidic alkyl phosphate as dispersant in 2250 parts of a solvent mixture of tetrahydrofuran and cyclohexanone for 5 hours in a vessel using a Turbomixer. The dispersion thus prepared was pumped into an intermediate vessel with slowly rotating paddle stirrers. The dispersion was continuously pumped from this intermediate vessel through a series of successive stirred ball mills for fine dispersion, each ball mill having a volume of 125 l and being filled with 91 l aluminium oxide grinding balls 1 to 2.5 mm in diameter. The residence time of the dispersion in each mill was 20 minutes. By continuous measurement of the a* value at the exit of each mill, as described in Applicants' German patent application P 37 31 804, it was found that the requisite degree of dispersion was reached after three grinding passes (FIG. 3).

Batch 2

737 Parts acicular $CrO_2$ having a coercitivity of 39.8 kA/m were dispersed together with 25 parts vinylidene chloride/acrylonitrile copolymer, 23 parts lecithin, 580 parts tetrahydrofuran and 209 parts cyclohexanone as solvent and the resulting dispersion was added to a binder solution consisting of 27 parts vinylidene chloride/acrylonitrile copolymer and 106 parts polyester urethane in 534 parts tetrahydrofuran and 200 parts cyclohexanone. The dispersion batch thus prepared was predispersed for 6 hours in a vessel using a Turbomixer, pumped into an intermediate vessel and then pumped continuously from the intermediate vessel through a series of successive stirred ball mills for fine dispersion, each ball mill having a volume of 125 l and being 80% filled with ceramic grinding elements 1 to 1.5 mm in diameter. The residence time in each mill was 25 minutes. By measurement of the a* value at the exit of each mill, it was found that the requisite degree of dispersion was reached after six passes (FIG. 3).

Batches 1 and 2 were then combined in such a way that the mixture contained 81 parts $CrO_2$ to 19 parts $\gamma$-$Fe_2O_3$. 2416 Parts of this fine dispersion were forced through a 1 μm mesh filter, mixed with 4 parts fatty acid, 9 parts butyl stearate and 15 parts of a 75% solution in ethyl acetate of a crosslinking agent (Desmodur L, a product of Bayer AG) and with 0.2 part iron acetylacetonate and the resulting mixture cast by extrusion coater onto an 8 μm PET film in a dry layer thickness of 3 μm, oriented in the magnetic field, dried and calendered.

COMPARISON EXAMPLE 1

140 Parts acicular Co-doped $\gamma$-$Fe_2O_3$ as in Example 1 and 597 parts acicular $CrO_2$, coercitivity 39.8 kA/m, were dispersed together with 25 parts vinylidene chloride/acrylonitrile copolymer, 23 parts lecithin, 580 parts tetrahydrofuran and 209 parts cyclohexanone as solvent and the resulting dispersion added to a binder solution consisting of 27 parts vinylidene chloride/acrylonitrile copolymer, 106 parts polyester urethane in 534 parts tetrahydrofuran and 200 parts cyclohexanone. The dispersion batch thus prepared was predispersed for 6 hours in a vessel using a Turbomixer, pumped into an intermediate vessel and then continuously pumped from the intermediate vessel through a series of six successive stirred ball mills for fine dispersion, each ball mill having a volume of 125 l and being 80% filled with ceramic grinding elements 1 to 1.5 mm in diameter. The residence time in each mill was 25 minutes. The fine dispersion was then forced through a 1 μm mesh filter, mixed with 4 parts fatty acid, 9 parts butyl stearate and 15 parts of a 75% solution in ethyl acetate of a crosslinking agent (Desmodur L, a product of Bayer AG) containing 0.2 part iron acetylacetonate and the resulting mixture cast by extrusion coater onto an 8 μm BET film in a dry layer thickness of 3 μm, oriented in the magnetic field, dried and calendered.

The magnetic recording materials obtained in accordance with Example 1 and Comparison Example 1 were compared with one another in regard to their mechanical and electroacoustic properties. In addition, the recording materials were each made up as video tape into a standard VHS cassette. The comparison revealed the following differences:

| (dB relative to reference) | Luminance | | Chroma | | Gloss (reflection 60°) |
| --- | --- | --- | --- | --- | --- |
| | RF | S-N | RF | S-N | |
| Example 1 | 4.5 | 2.4 | 3.2 | 2.0 | 150 scale units |
| Comparison Example 1 | 3.5 | 1.3 | 2.7 | 1.5 | 120 scale units |

The recording material produced by the process according to the invention shows in particular distinctly improved luminance values and gloss values. In a picture comparison using the standard colored bar signal, the video tape produced in accordance with Example 1 showed noticeably improved reproduction.

EXAMPLE 2

Batch 1

The procedure was as in Example 1, except that 1200 parts acicular $Fe_3O_4$ having a coercitivity of 42 kA/m were used.

Batch 2

The procedure was as in Example 1. Batches 1 and 2 were combined in such a way that the mixture contained 70 parts $CrO_2$ for 30 parts $Fe_3O_4$. 2416 parts of this fine dispersion were forced through a 1 μm mesh filter, mixed with 4 parts fatty acid, 9 parts butyl stearate and 15 parts of a 75% solution in ethyl acetate of a crosslinking agent (Desmodur L, a product of Bayer AG) containing 0.2 part iron acetyl acetonate and the resulting mixture applied by extrusion coater to an 8 μm PET film in a dry layer thickness of 3 μm, oriented in the magnetic field, dried and calendered.

COMPARISON EXAMPLE 2

221 Parts acicular $Fe_3O_4$ as in batch 1, Example 1, and 516 parts $CrO_2$ as in batch 2 were mixed with other additives and treated in the same way as in Comparison Example 1.

The recording materials obtained in accordance with Example 2 and Comparison Example 2 were compared in their properties, the magnetic tapes additionally being made into as 8 mm video cassettes.

| (dB relative to reference) | Luminance | | Chroma | | Gloss (reflection 60°) |
| --- | --- | --- | --- | --- | --- |
| | RF | S-N | RF | S-N | |
| Example 2 | 5.0 | 3.5 | 3.4 | 2.4 | 140 scale units |
| Comparison Example 2 | 4.1 | 2.3 | 2.6 | 1.7 | 110 scale units |

The recording support obtained in accordance with Example 1 had altogether better properties and, made up into 8 mm video cassettes, was also superior in a picture comparison.

In a variant of the process according to the invention, the pigment component requiring a longer grinding time was finely ground with the desired additives in several passes, subsequently combined with a predispersed pigment component, which was also provided with corresponding additives and requires a shorter grinding time, in an intermediate vessel and ground to completion in further passes. In a test, batch 2 of Example 1 was preground in three mill passes, subsequently combined with batch 1 in the necessary mixing ratio and the resulting mixture ground to completion in another three mill passes. In this case, too, the recording material showed improved properties compared with the grinding of a pigment mixture.

We claim:

1. A process for the production of a magnetic recording material having a magnetic dispersion cast onto a nonmagnetic layer support, comprising the steps of:
   (a) separately finely grinding at least two different batches of magnetic pigments finely dispersed in a polymeric binder to a desired degree of dispersion;
   (b) combining the separately ground magnetic pigment dispersions to form the magnetic dispersion;
   (c) applying the magnetic dispersion to the layer support.

2. The process of claim 1 wherein a dispersion aid replaces the polymeric binder.

3. The process of claim 1 wherein a solvent replaces the polymeric binder.

4. The process of claim 1 wherein in step (b) additives are combined with the separately ground magnetic pigment dispersions to form the magnetic dispersion.

5. The process of claim 1 further comprising before step (c):
   (b') finely grinding the magnetic dispersion to a desired degree of dispersion.

6. The process of claim 1 wherein the magnetic pigments are selected from the group consisting of gamma-$FE_2O_3$, doped gamma-$FE_2O_3$, $FE_3O_4$, doped $FE_3O_4$, $CrO_2$, doped $CrO_2$ and metal pigments with an oxide coating.

7. The process of claim 1 wherein the degree of dispersion is continuously measured by a colorimetric arrangement.

8. The process of claim 5 wherein the degree of dispersion is continuously measured by a colorimetric arrangement.

* * * * *